A. K. HOMME.
BEAR TRAP.
APPLICATION FILED SEPT. 18, 1918.
1,295,318. Patented Feb. 25, 1919.
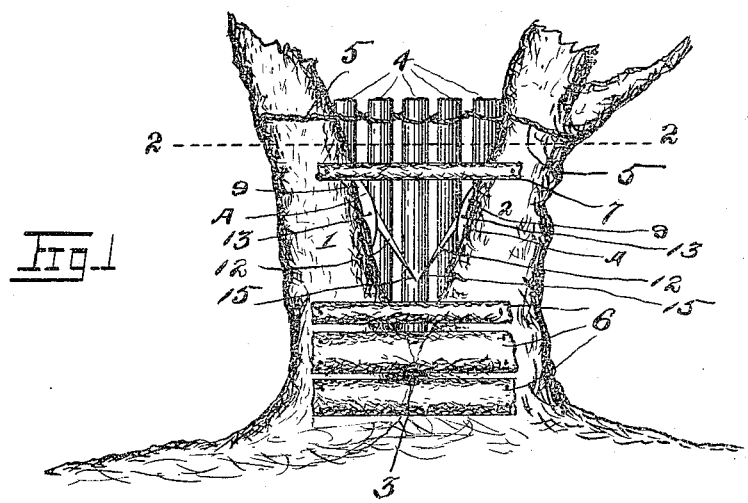
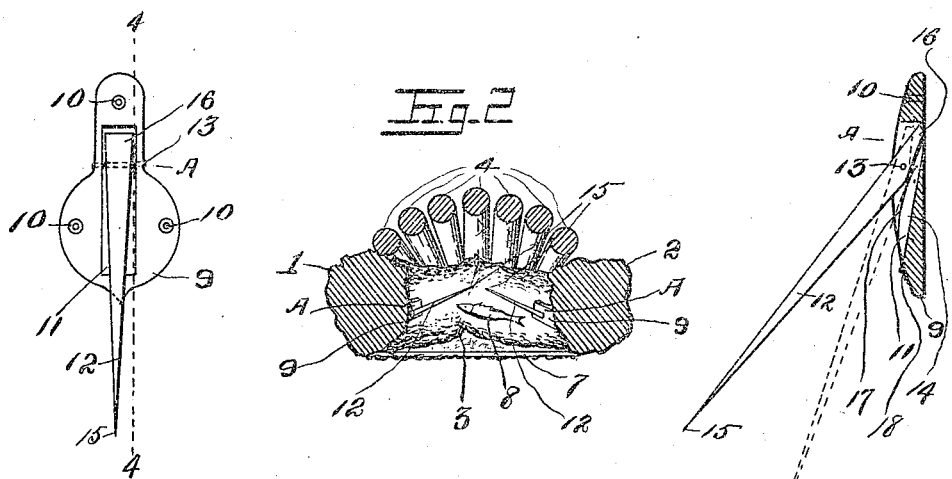
Inventor
Andrew Knutson Homme
By D. R. O'Neail
His Attorney

UNITED STATES PATENT OFFICE.

ANDREW KNUTSON HOMME, OF WARROAD, MINNESOTA.

BEAR-TRAP.

1,295,318.  Specification of Letters Patent.  Patented Feb. 25, 1919.

Application filed September 18, 1918. Serial No. 254,638.

*To all whom it may concern:*

Be it known that I, ANDREW KNUTSON HOMME, subject of the King of Great Britain, residing at Warroad, in the State of Minnesota, United States of America, have invented certain new and useful Improvements in Bear-Traps, of which the following is a specification.

My invention relates to bear traps and more particularly to an attachment which may be used in connection with traps built upon the ground where used, the objects of the invention being the provision of an attachment of light weight that a number of them may be carried by a trapper without being burdensome, the said trap attachment forming the means whereby the escape of the bear after he has once placed his head in the trap is rendered impossible.

The said means will be found first fully described in the following specification and then more particularly pointed out in the appended claim, reference also being had to the drawings forming part hereof in which similar characters of reference indicate similar parts throughout the different views, and in which—

Figure 1 is a bear trap formed between two suitably spaced trees to which the bear holding attachment is secured.

Fig. 2 is a section taken on the plane of the line 2 in Fig. 1.

Fig. 3 is an elevation of one of the attachments, and

Fig. 4 is a sectional view on the line 4 in Fig. 3.

Wherever possible I prefer to prepare my traps in the manner shown in Figs. 1 and 2, that is to say, between trees growing at a suitable spacing from each other. In the drawings 1 and 2 indicate two trees growing in a manner to provide a suitable fork 3 as a basis for the trap. The rear of the fork 3 I prefer to inclose by the stakes 4 driven into the ground in stockade fashion, the upper ends of the stakes being secured together by a rope or ropes 5 woven therearound and around the trees 1 and 2. In the absence of a suitable rope or cable I make use of a grape vine, tree roots or other substitutes, this being a minor point so long as the stockade is rendered strong.

The front of the trap I close up to approximately the height of a bear, by nailing boughs or split saplings 6 to the fronts of the trees 1 and 2. I may also nail a further strip 7 to the trees at a distance above the closure 6 so as to leave a space for the entrance of the bear's head.

At the bottom of the crotch I lay a bait indicated as 8, which may be a piece of meat, fish or other substance attractive to the bear.

The holding attachment A, best shown in Figs. 3 and 4, comprises a base member 9 having the apertures 10 through which nails may be passed to secure it to a tree or other support. The base member 9 is longitudinally slotted to provide a recess 11, a spike like member 12 having its larger end hinged in the recess 11 by means of the pivot 13 which passes through the said member and the walls of the recess. The bottom of the recess 11, it will be noted, is sloped inwardly as at 14 so that a considerable depression of the point 15 of the member 12 is permitted, the extremity 16 of the larger end of the said member 12 being shaped to bear against the tree or other support to which the base member is secured, to prevent outward movement of the point beyond a predetermined degree. Thus the member 12 is rotatable on the pivot 13 within the limits described and a spring 17 is mounted on the base member 9 by means of the nail 18 in a position to bear against the under side of the member 12 and maintain it normally in its outward position.

The member 12 it will be noted, tapers gradually from its pivoted end to the point 15 which is preferably ground to a piercing sharpness.

In practice I make use of two of the attachments for each trap, these being secured to the trees forming the sides of the trap, in the positions shown in Figs. 1 and 2, that is to say, having their members 12 inwardly and downwardly directed toward each other, so that their points 15 are meeting almost directly over the center of the trap. In this position, when a bear places his head in the trap and reaches down toward the bait, the points of the members 12 are forced away from each other against their springs 17 but without injury to the bear; when however, he undertakes to withdraw his head the points 15 of the members 12 will penetrate behind his skull or such other part as may be in contact with them, and effectually prevent him from withdrawing. The death of the bear, due to the penetration of the spikes, is the inevitable result.

Where two trees are not found in the desired position I nail a sapling to a single tree to provide the necessary fork.

From the foregoing description it will be seen that all a trapper requires to carry is a supply of the attachments, a few nails and an axe, the latter being always a part of his equipment. The attachments are very light and a large number of them may be carried and even then only approximate the weight of a single bear trap of the older types. Actual practice has demonstrated a great advantage on this point, as also the accuracy of the results obtained by means of the attachments.

Having thus fully described my said invention what I claim is—

An attachment for a trap comprising a base member adapted for attachment to the side of a trap and having a central slot, a pointed member having its penetrating end extending away from the base member and its other end pivoted in the slot, the pivoted end of the pointed member extending through the slot and shaped to bear against the side of the trap to prevent upward rotation of the penetrating end, and yielding means opposed to its rotation in the opposite direction.

In testimony whereof, I affix my signature.

ANDREW KNUTSON HOMME.